United States Patent [19]

Uchiyama

[11] Patent Number: 4,744,436
[45] Date of Patent: May 17, 1988

[54] ADAPTER CASE ASSEMBLY IN FOUR-WHEEL DRIVE VEHICLE

[75] Inventor: Hirao Uchiyama, Yokohama, Japan

[73] Assignee: Nissan Motor Co., Ltd., Yokohama, Japan

[21] Appl. No.: 884,523

[22] Filed: Jul. 11, 1986

[30] Foreign Application Priority Data

Jul. 12, 1985 [JP] Japan .................. 60-106638[U]

[51] Int. Cl.$^4$ ............................................. F16H 57/02
[52] U.S. Cl. ............................... 180/233; 74/606 R; 464/178
[58] Field of Search ................ 180/233, 247, 248; 74/606 R; 184/1.5, 6.12; 464/170, 177, 178

[56] References Cited

U.S. PATENT DOCUMENTS

| | | | |
|---|---|---|---|
| 2,647,596 | 8/1953 | Cook | 74/606 R |
| 3,382,735 | 5/1968 | Gatiss | 74/606 R |
| 4,424,840 | 1/1984 | Pousette et al. | 464/178 |
| 4,632,207 | 12/1986 | Moore | 180/247 |

*Primary Examiner*—John J. Love
*Assistant Examiner*—Charles R. Watts
*Attorney, Agent, or Firm*—Foley & Lardner, Schwartz, Jeffery, Schwaab, Mack, Blumenthal & Evans

[57] ABSTRACT

A four-wheel drive vehicle is provided in its drive mechanism with an adapter case assembly interposed between a transmission and a transfer case. The adapter case assembly consists of a cylindrical and hollow outer wall member securely interposed between the housing of the transmission and the housing of the transfer case. The outer wall member is integrally formed with a generally frustoconical partition wall member disposed inside the outer wall member and located around a power output shaft drivingly connecting the transfer case with the transmission. The partition wall member defines thereinside an inner chamber of a smaller volume, communicated with the inside of the transmission housing so that oil within the transmission can flow into the inner chamber, thereby preventing much oil from flowing out from the transmission into the adapter case assembly.

13 Claims, 4 Drawing Sheets

ADAPTER CASE ASSEMBLY IN FOUR-WHEEL DRIVE VEHICLE

BACKGROUND OF THE INVENTION

1. Field of the Invention

The present invention relates to an improvement in an adapter case assembly used in a drive mechanism of a four-wheel drive vehicle, and more particularly to the construction of the adapter case assembly for preventing oil level from lowering in a transmission, caused by movement of oil from transmission to the adapter case assembly.

2. Description of the Prior Art

Most four-wheel drive vehicles are provided in its drive mechanism with an adapter case assembly for transmitting power or driving force from an engine to four road wheels. The adapter case assembly is interposed between a transmission and a transfer case thereby to transmit the driving force to the transfer case. However, when the vehicle inclines rearwardly for example during ascending a steep slope, oil within the transmission unavoidably flows out from the transmission and moves into the adapter case assembly, so that the oil level of the transmission considerably lowers. As a result, for example in case of using an automatic transmission, the oil level of the transmission will lower below an oil suction opening to generate no oil pressure for oil clutches in the transmission thereby interrupting transmission of the driving force.

SUMMARY OF THE INVENTION

An adapter case assembly according to the present invention consists of an outer wall structure securely and sealingly interposed between the housing of a transmission and the housing of a transfer case, defining a space thereinside. Additionally, a partition wall structure is disposed inside the outer wall structure and located around a power output shaft which drivingly connects the transfer case with the trasmission. The partition wall structure has a first end section securely and sealingly connected to the outer wall structure, and a second end section disposed sealingly relative to the power output shaft. The partition wall structure divides the space into an inner chamber defined inside the structure and an outer chamber defined outside the structure. The inner chamber is in communication with the inside of the transmission housing so that oil in the transmission can flow into the inner chamber.

Accordingly, when the vehicle inclines rearwardly during ascending a steep slope, oil within the transmission flows into the inner chamber of a smaller volume defined inside the partition wall structure, in which the oil cannot flows out to the outer chamber defined outside the partition wall structure. Consequently, only little oil moves from the transmission to the adapter case assembly, so that the oil level of the transmission hardly lowers. In addition, according to the shape of the partition wall structure, the amount of oil flown into the inner chamber can be extremely minimized thereby to always maintain a required oil level in the transmission.

BRIEF DESCRIPPTION OF THE DRAWINGS

DETAILED DESCRIPTION OF THE INVENTION

Figure 1:
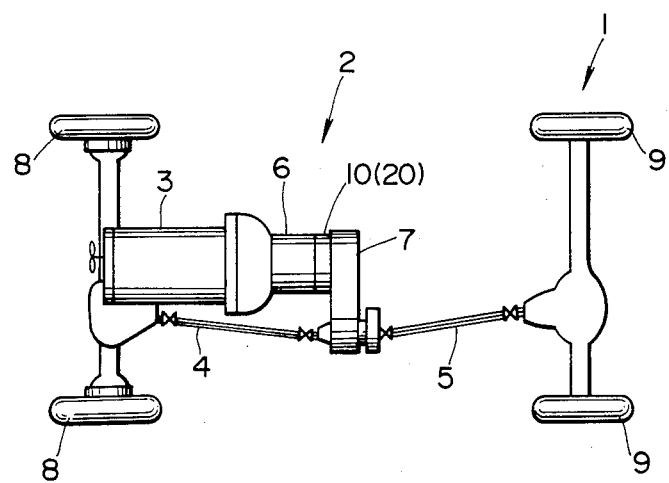
FIG. 1 is a schematic illustration of a drive mechanism of a four-wheel drive vehicle, showing the location of an adapter case assembly.

To facilitate the present invention, a brief reference is made to a conventional drive mechanism 2 of a four-wheel drive vehicle 1 shown in FIG. 1. In the drive mechanism 2, driving force from an engine 3 is transmitted to drive shafts 4, 5 through a transmission 6 and a transfer case 7. One drive shaft is adapted to drive two wheels 8, 8 while the other drive shaft 5 is adapted to drive the other two wheels 9, 9.

Figure 2:
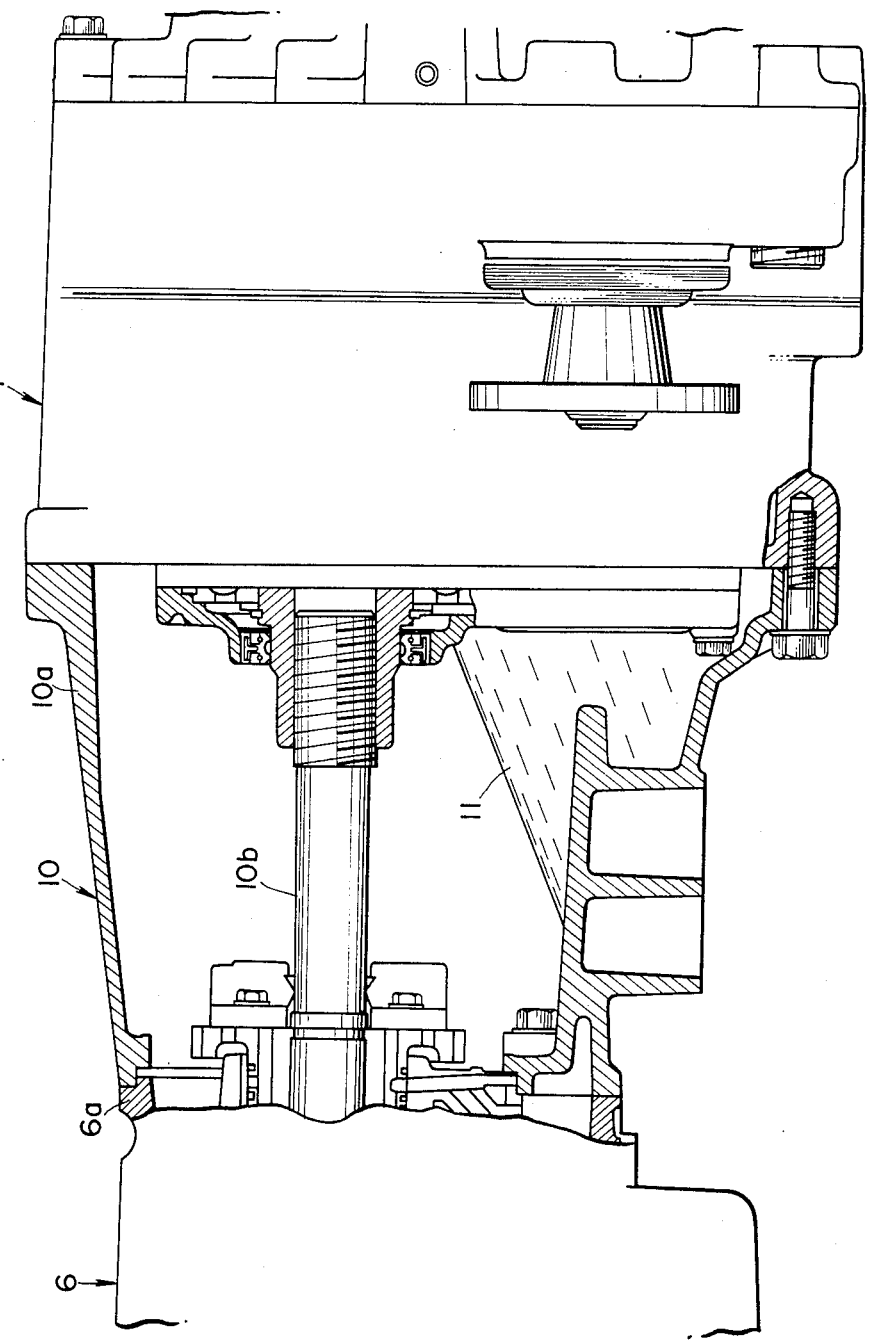
FIG. 2 is a longitudinal sectional view of a conventional adapter case assembly.

Additionally, an adapter case assembly 10 is provided between the transmission 6 and the transfer case 7 for the purpose of installing the transfer case 7 to the output shaft side of the transmission 6. An example of such an adapter case assembly 10 is shown in FIG. 2, in which the adapter case assembly 10 includes a housing 10a which is securely interposed between the housing 6a of the transmission 6 and formed generally into the cylindrical shape to define a space thereinside. A power output shaft 10b is disposed inside the housing 10a of the adapter case assembly 10 in such a manner as to extend along the axis of the housing 10a. The output shaft 10b drivingly connects the transfer case 7 with the transmission 6.

However, in the thus arranged conventional adapter case assembly 10, the housing 10a is generally of the shape of a hollow cylinder opened at opposite ends, and therefore oil in the transmission 6 unavoidably flows into the adapter case assembly 10 when the vehicle ascends a steep slope, as indicated by the reference numeral 11 in FIG. 2. Accordingly, the oil level of the transmission 6 lowers to cause insufficient lubrication of the gears of the transmission in case of a manual transmission while to allow driving force not to be transmitted to the transfer case 7 in case of an automatic transmission because the oil level becomes below an oil suction opening thereby generating no oil pressure in hydraulic clutches.

In order to avoid the above problems, a measure for storing much oil in the transmission has been taken; however, this unavoidably causes further problems in which the weight of the vehicle unnecessarily increases and considerable heat generation is made upon oil agitation by a power train within the transmission. Hence, it is eagerly required to always maintain oil level of the transmission above a predetermined level, for example, the level of oil suction opening of the transmission in case of using an automatic transmission.

Figure 3:
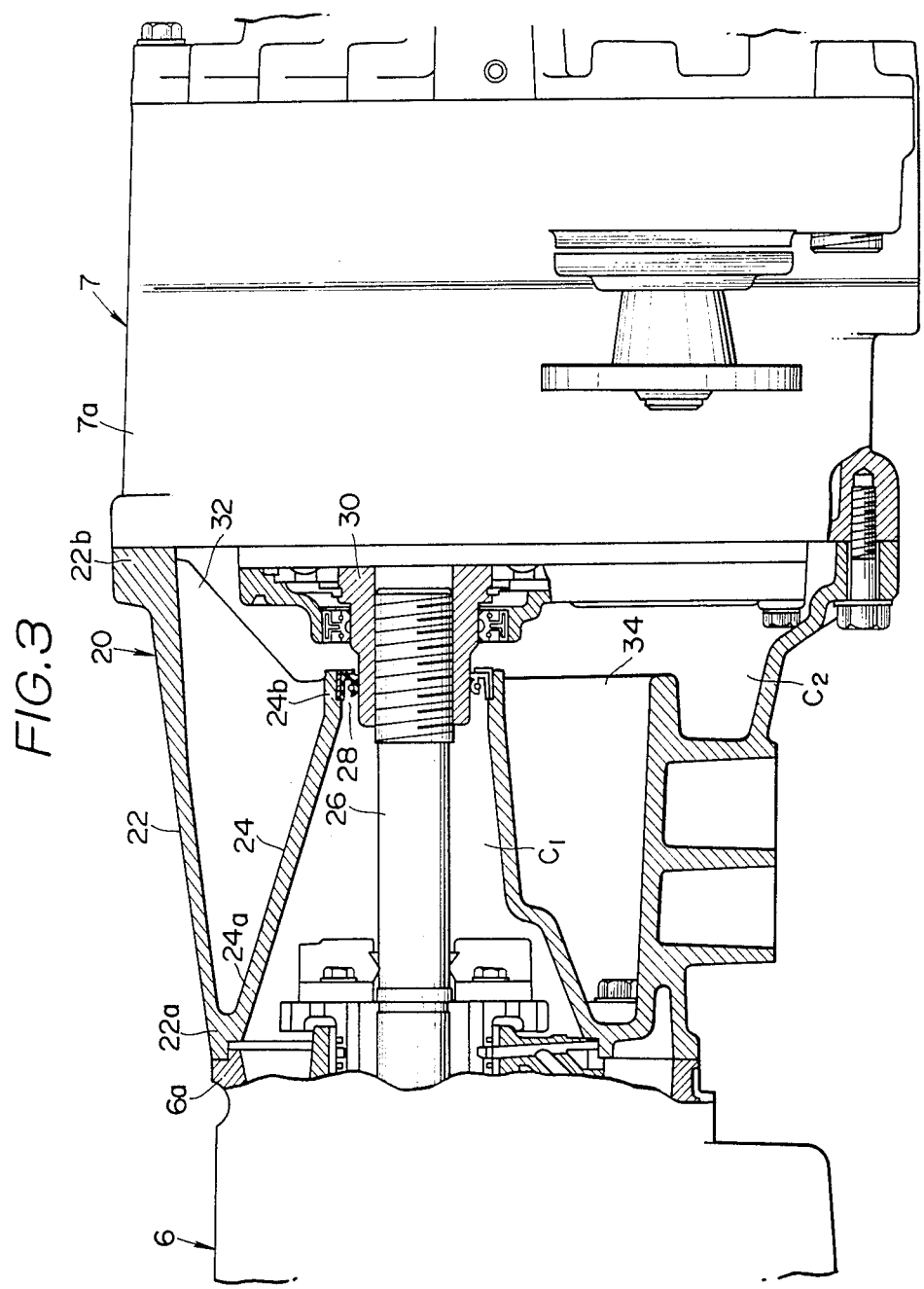
FIG. 3 is a longitudinal sectional view of a preferred embodiment of an adapter case assembly in accordance with the present invention.
Figure 4:
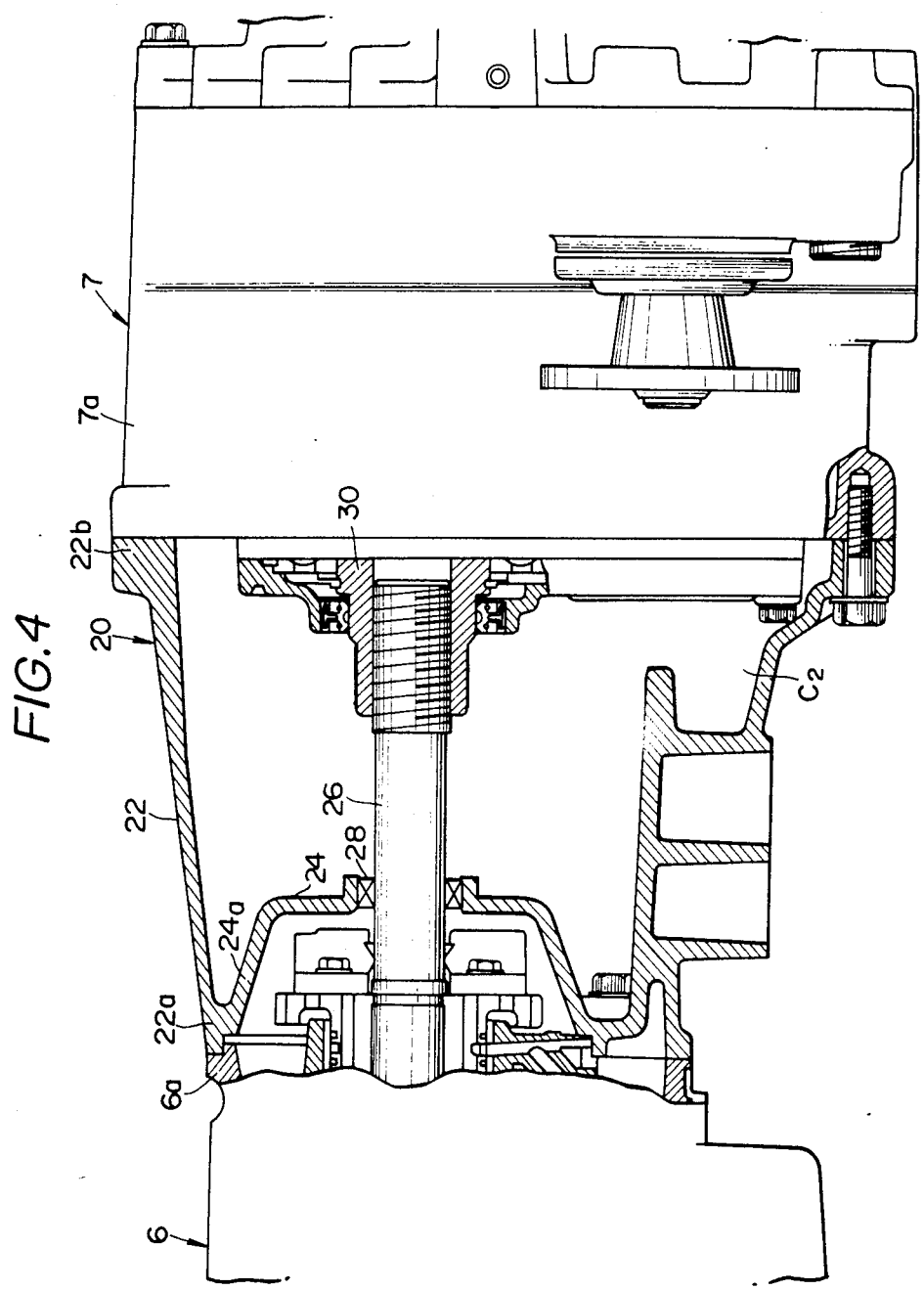
FIG. 4 is a longitudinal sectional view of an alternate embodiment of an adapter case assembly in accordance with the present invention.

In view of the above description of the conventional adapter casing assembly 10 used in the four-wheel drive vehicle, reference is now made to FIG. 3 wherein a preferred embodiment of an adapter case assembly 20 which is disposed in the same position as in the above-mentioned conventional adapter case assembly 10 in the four-wheel drive vehicle 1 shown in FIGS. 1 and 2 so that the same reference numerals as in these figures designate same elements and parts in this embodiment.

Thus, the adapter case assembly 20 is securely interposed between the transmission 6 and the transfer case 7 in the drive mechanism 2 of the four-wheel drive vehicle 1. The adapter case assembly 20 consists of a housing or outer wall member 22 which is generally cylindrical and hollow to have first and second generally annular opposite end sections 22a, 22b. The first end section 22a is securely and sealingly fixed throughout the whole periphery to a generally annular end section (no numeral) of the transmission housing 6a. The second end section 22b is securely and sealingly fixed throughout whole the periphery to a generally annular end section of the housing 7a of the transfer case 7. The housing 22 of the adapter case assembly 20 is integrally formed with a generally frustoconical partition wall member 24 which has first and second generally annular opposite end sections 24a, 24b. In this case, the first end section 24a is larger in diameter or cross-sectional area than the second end section 24b and integral with the housing 22 in the vicinity of the first end section 22a. The second end section 24b is separate and spaced from the housing 22. The generally frustoconical partition wall member 24 is located around a power output shaft 26 and extends along the shaft 26. The power output shaft 26 is arranged to drivingly connect the transfer casing 7 with the transmission 6 and passes through the central section of the space inside the housing 22 in such a manner as to extend in the direction from first end section 22a toward the second end section 22b of the housing 22. The partition wall member 24 defines an inner chamber $C_1$ thereinside and an outer chamber $C_2$ thereoutside.

As shown, the second end section 24b of the partition wall member 24 is securely mounted through an annular oil seal 28 on a generally cylindrical sleeve 30 fixedly fitted on the power output shaft 26 so that oil-tight seal is kept between the partition plate member second end section 24b and the power output shaft 26. Accordingly, the sleeve 30 rotates with the power output shaft 26 so that power output from the shaft 26 is transmitted to the side of the transfer case 7. This structure prevents oil from flowing out from the inner chamber $C_1$ to the outer chamber $C_2$. Vertical wall members 32, 34 are provided to connect the housing 22 and the partition wall member 24 and so positioned as to divide the outer chamber $C_2$ into two parts, thus increasing structural rigidity of the adapter case assembly 20. The vertical wall members 32, 34 are integral with the housing 22 and the partition wall member 24.

In operation, when the vehicle 1 is in such an inclined position that its rear section is lower than its front section, for example, during ascending a steep slope, oil within the transmission 6 flows out into the adapter case assembly 20 which is positioned lower than the transmission 6 in the direction of gravity. The oil flows into the inner chamber $C_1$ along the inner surface of the partition wall member 24, but is prevented from flowing out of the inner chamber $C_1$ by virtue of the oil seal 28 interposed between the partition wall member 24 and the power output shaft 26. It will be understood that the partition wall member 24 is positioned considerably higher than a rear section (in the vicinity of the transfer case 7) of the outer chamber $C_2$ in the direction of gravity, and therefore a very slight amount of the oil flows into the inner chamber $C_1$ thereby to extremely minimize the lowering of oil level of the transmission 6.

It will be appreciated that since the partition wall member 24 of this embodiment is of the generally frustoconical shape in which its diameter increases in the direction toward the transmission 6, the oil once flown into the inner chamber $C_1$ is liable to flow back to the side of the transmission 6 along the frustoconical inner surface of the partition wall member 24.

While the oil seal 28 has been shown and described as being interposed between the partition wall member 24 and the sleeve 30 fittingly mounted on the power output shaft 26 in this embodiment, it will be understood that the oil seal 28 may be located in such a manner that its inner periphery is in direction contact with the power output shaft 26 as indicated in phantom in FIG. 3, upon shortening the axial length of the partition wall member 24. Such an arrangement of the partition wall member 24 decreases the volume of the inner chamber $C_1$, thus decreasing the amount of oil flowing into the inner chamber $C_1$ while facilitating smooth return of the flown-out oil back to the transmission 6.

As appreciated from the above, according to the present invention, the adapter case assembly of the drive mechanism of the four-wheel drive vehicle is provided with the partition wall member which divides the space defined inside the housing into the inner and outer chambers, the inner chamber being in communication with the transmission. Accordingly, lowering in oil level of the transmission can be effectively suppressed within a very small range, thereby preventing hydraulic clutches and the like from causing operational failures while making unnecessary to store a large amount of oil in the transmission.

What is claimed is:

1. An adapter case assembly for connecting a transmission and a transfer case in a four-wheel drive vehicle, comprising:
   a rotatable power output shaft extending from the transmission and adapted to be rotated by the transmission, the shaft for drivingly connecting the transfer case with the transmission;
   outer wall means securely and sealingly interposed between the housing of the transmission and the housing of the transfer case, said outer wall means defining thereinside a space;
   partition wall means disposed inside said outer wall means and located around said power output shaft and extending along said output shaft, said partition wall means having a first end section securely and sealingly connected to said outer wall means, and a second end section sealingly surrounding said power output shaft, said partition wall means dividing said spaced into an inner chamber defined inside said partition wall means and an outer chamber defined outside said partiton wall means, said inner chamber being in communication with the inside of the transmission housing.

2. An adapter case assembly as claimed in claim 1, further comprising seal means for maintaining a fluid-tight seal between said partition wall means second end section and said power output shaft.

3. An adapter case assembly as claimed in claim 2, wherein said outer wall means includes a generally cylindrical and hollow outer wall member having a first end section securely and sealingly connected to the transmission housing, and a second end section securely and sealingly connected to the transfer case housing.

4. An adapter case assembly as claimed in claim 3, wherein said partition wall means includes a generally cylindrical and hollow partition wall member having a first end section securely connected to said outer wall member in the vicinity of the first end section, and a second end section sealingly surrounding said power output shaft.

5. An adapter case assembly as claimed in claim 4, wherein said partition wall member is generally frusto-conical so that the first end section is larger in cross-sectional area than the second end section.

6. An adapter case assembly as claimed in claim 5, wherein said partition wall member is integral at the first end section with said outer wall member in the vicinity of the first end section.

7. An adapter case assembly as claimed in claim 4, wherein said seal means includes an annular oil seal disposed between said partition wall member second end section and said power output shaft.

8. An adapter case assembly as claimed in claim 7, further comprising a sleeve member fixedly mounted on said power output shaft, said sleeve member being drivingly connected to said transfer case, wherein said annular oil seal is interposed between said partition wall member second end section and said sleeve member.

9. An adapter case assembly as claimed in claim 7, wherein said oil seal is interposed between said partition wall member second end section and said power output shaft so that said oil seal is in direct contact with said power output shaft.

10. An adapter case assembly as claimed in claim 4, further comprising reinforcement wall members disposed between said outer wall member and said partition wall member to connect said outer wall member and said partition wall member.

11. An adapter case assembly as claimed in claim 10, wherein said reinforcement wall members are integral with said outer wall member and said partition wall member.

12. An adapter case assembly as claimed in claim 10, wherein said reinforcement wall members include first and second wall members located opposite to each other with respect to said partition wall member, said first and second wall members being located vertical with respect to the vehicle.

13. An adapter case assembly for connecting a transmission and a transfer case in a four-wheel drive vehicle, comprising:
   a rotatable power output shaft drivingly connecting the transfer case with the transmission;
   outer wall means securely and sealingly interposed between housing of the transmission and housing of the transfer case, said outer wall means defining thereinside a space; and
   partition wall means disposed inside said outer wall means and located around said power output shaft and extending along said output shaft, said partition wall means having a first end section securely and sealingly connected to said outer wall means, and a second end section sealingly surrounding said power output shaft, said partition wall means dividing said space into an inner chamber defined inside said partition wall means and an outer chamber defined outside said partition wall means, said inner chamber being in fluid communication with the inside of the transmission housing and being dimensioned so as to receive a part of a mechanism of the transmission extending through the first end section of said partition wall means into said inner chamber.

* * * * *